United States Patent [19]
Lavin

[11] 3,922,786
[45] Dec. 2, 1975

[54] METHOD AND APPARATUS FOR FORMING AND FITTING ORTHODONTIC APPLIANCES

[76] Inventor: Joseph L. Lavin, S. 525 Bernard St., Spokane, Wash. 99204

[22] Filed: Jan. 30, 1974

[21] Appl. No.: 437,810

[52] U.S. Cl. .................................. 32/11; 32/14 F
[51] Int. Cl.² ........................................ A61C 13/00
[58] Field of Search .......................... 32/11, 14, 71

[56] References Cited
UNITED STATES PATENTS

| | | | |
|---|---|---|---|
| 2,539,278 | 1/1951 | Schwehr et al. | 32/71 |
| 3,458,936 | 8/1969 | Schulz et al. | 32/71 |
| 3,521,355 | 7/1970 | Pearlman | 32/14 A |
| 3,657,817 | 4/1972 | Kesling | 32/14 A |
| 3,738,005 | 6/1973 | Cohen | 32/14 B |

*Primary Examiner*—Robert Peshock
*Attorney, Agent, or Firm*—Wells, St. John & Roberts

[57] ABSTRACT

A method and apparatus are disclosed for correcting malocclusions of a patient's teeth by utilizing conventional archwires. The method basically involves: (a) mounting a set of archwire brackets on the patient's teeth; (b) taking a negative impression in resilient material of the subject teeth and the brackets mounted thereto; (c) forming a replica working model from the negative impression with a second set of brackets located thereon in identical positions relative to corresponding brackets on the patient's teeth; (d) constructing archwires to fit the brackets on the working model; and (e) fitting the constructed archwires to the patient's malocclused teeth. The apparatus is basically comprised of a root stem and an adjustable interconnecting member affixed to the root stem. The connecting members serve to solidly anchor the brackets to the working model. The root stems enable separation of individual tooth dies from the working model, once an index has been poured around the ends of the root stems protruding from the working model. Such separation allows additional subsequent method steps in the correctional process, of forming a bite impression of the patient's teeth. This is done at a time after the first archwire has been applied to the patient's mouth and some correctional movement of the maligned teeth is evident. The individual tooth dies are then placed in complementary tooth depressions formed in the bire impression. A progressive index is then poured about the exposed root stems. This step results in the forming of a progressive working model. The orthodontist may then repeat steps (d) and (e) above to continue a correctional process on the patient's malaligned teeth. Several progressive working models may be utilized before the patient's teeth are brought into proper alignment.

16 Claims, 12 Drawing Figures

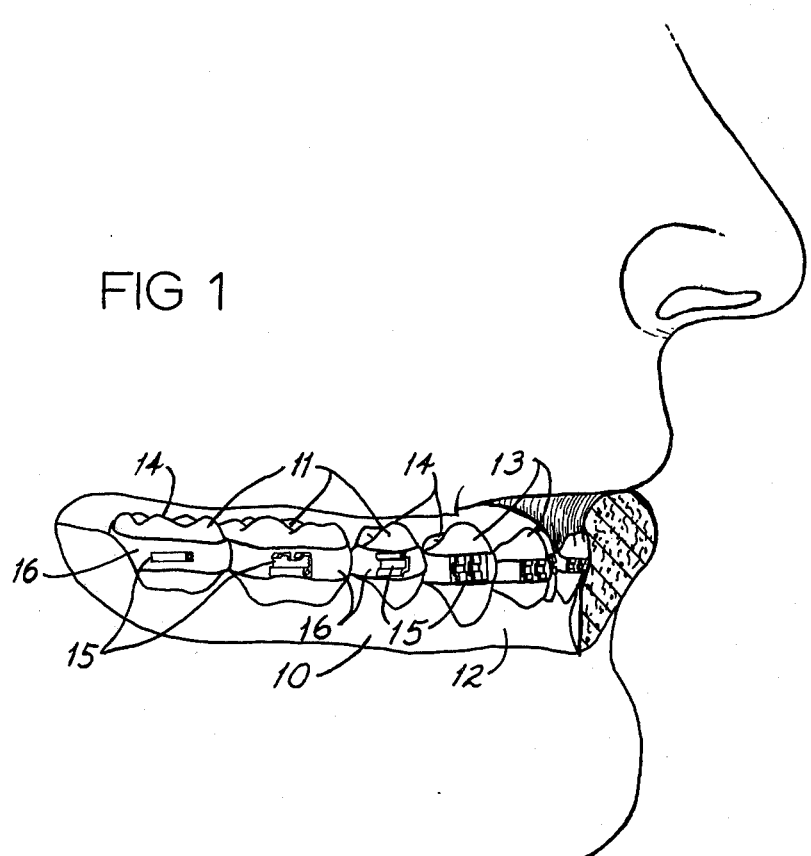
FIG 1
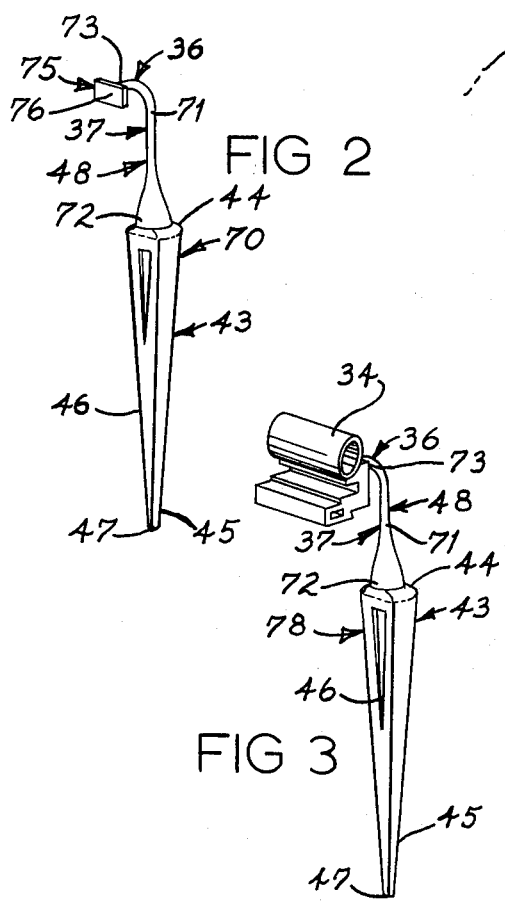
FIG 2
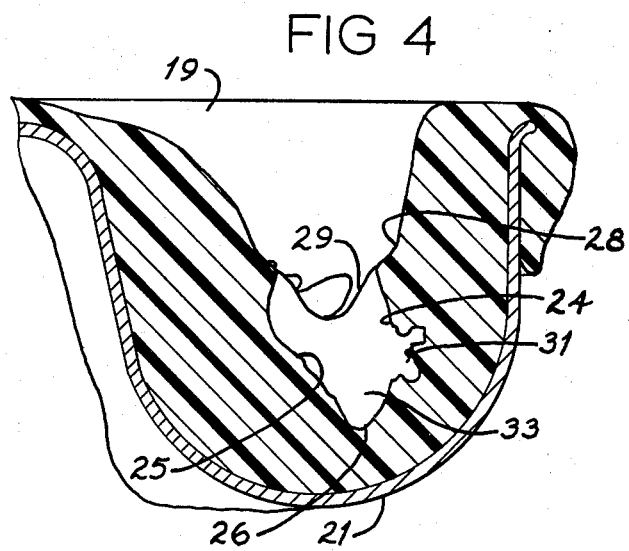
FIG 3
FIG 4

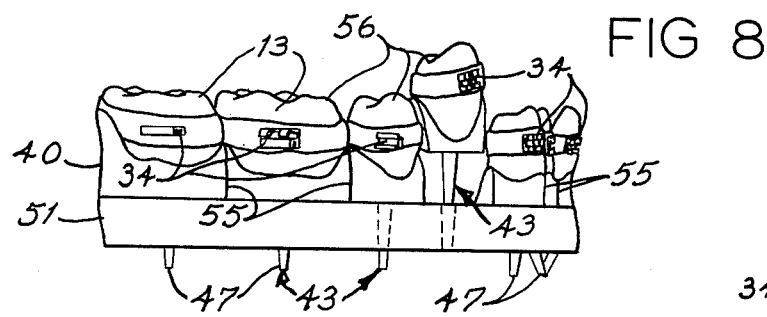
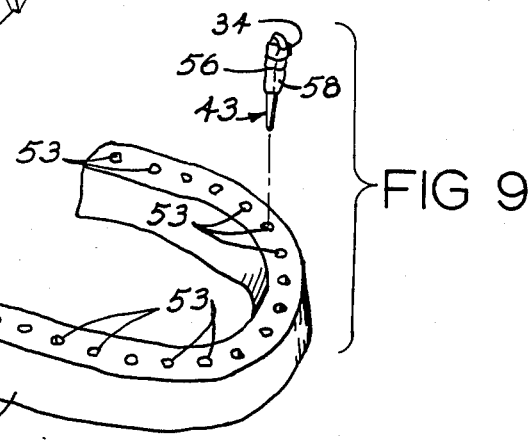
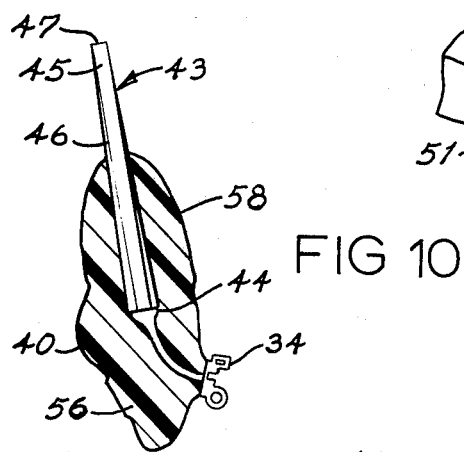
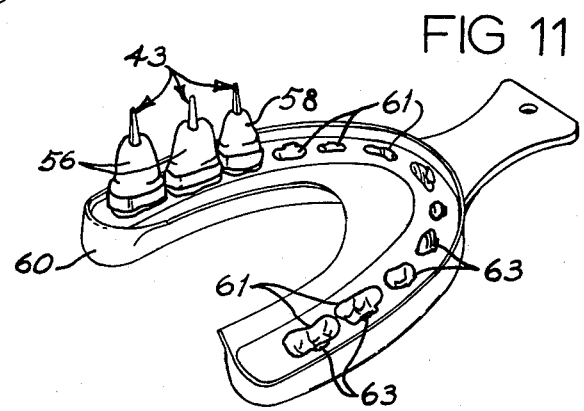
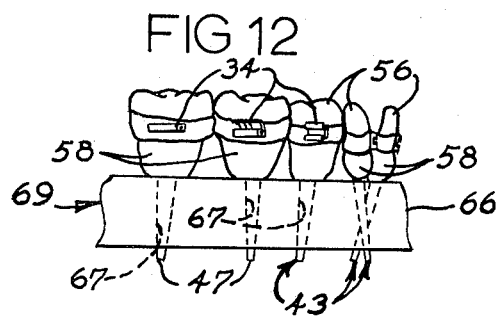

METHOD AND APPARATUS FOR FORMING AND FITTING ORTHODONTIC APPLIANCES

BACKGROUND OF THE INVENTION

This invention relates to the field of orthodontic and more particularly to methods and apparatus for forming and fitting orthodontic appliances.

Orthodontics is principally concerned with the straightening of irregular teeth patterns. Generally, the technique involves the broad concept of first diagnosing the extent of the irregular pattern and devising a course of treatment in which teeth are realigned into a desired configuration. Generally it is desirable to realign the teeth so that the upper and lower teeth come into engagement in a substantially flat occlusal plane. Depending upon the degree of mis or malalignment, the orthodontist generally sequentially removes the rotation of the tooth about the root axis; tilts or moves the tooth laterally either inward or outward to bring the teeth into general alignment, and raises (elongates) or lowers (intrudes) to bring the biting surfaces of the teeth into a substantially flat occlusal plane. To accomplish the movement of the teeth, biasing forces are applied to the teeth to cause the desired progressive movement. The biasing forces are generally applied to the teeth by the use of archwires or spring devices. The archwires are interconnected to the teeth by archwire brackets that are fixed to the teeth. The archwires are anchored to selected anchor teeth with the archwire being formed in desired spring configurations to apply biasing forces to the teeth through the archwire brackets. Frequently, it is necessary to progressively move the teeth to their desired positions. Frequently, initial archwires are attached to the archwire brackets to remove the rotation of the tooth. After the rotation is removed, different archwires are attached to the brackets to move the teeth laterally either inward or outward. Subsequently, different archwires are applied to intrude or elongate the teeth.

Generally the orthodontic archwires are made from a stainless steel wire (spring wire) having a diameter of 0.01 to 0.022 inches for the round wires and cross-section of 0.10 × 0.020 to 0.022 × 0.028 inches for the rectangular wires. The archwires are constructed of various cross-sectional shapes and designs for applying the desired biasing forces to the teeth. Archwires are frequently referred to as orthodontic appliances. Many archwires of various diameters and configurations are necessary to accomplish the desired positioning of the malaligned or malocclused teeth.

Archwire construction has become extremely refined in the last decade. Newly developed archwires are ofter provided in configurations of helixes and springs, delivering forces measured in grams and twisting force (torque) measured in gram millimeters. Forming the archwires to the desired configuration is generally referred to as "constructing" the archwire. Generally the construction of archwires is accomplished by either the direct method or by the indirect method.

The direct method involves the fixing of the archwire brackets to the teeth and then forming and shaping the archwire to the brackets as the patient sits in the dental chair with his mouth open. The wire must be placed repeatedly into the mouth so measurements from bracket to bracket can be made and the wire may be bent to various configurations to that the desired forces will be applied to the teeth. Not only is such a process strenuous to the patient, but the orthodontist must overcome the problem of patient saliva and patient fatique. Frequently it is very difficult to accurately construct the archwire to accomplish the desired force pattern. It is also often that compensations must be made in which the subsequent archwires are utilized to overcome undesirable effects produced by such an inaccurate archwire construction technique.

U.S. Pat. No. 3,439,421 granted to T. E. Perkowski describes a method of making orthodontic appliances wherein the indirect method is utilized along with an articulator and a bracket applying guage. The articulator aids in repositioning individual tooth dies within a study model wherein the teeth of the study model are substantially aligned along a predetermined corrected arch. Orthodontic bands had previously been fitted to the individual tooth dies. By using the bracket applying guage, the proper position of the brackets are established and the brackets are secured to the bands. Once the archwires have been constructed, the orthodontist removes the bands and brackets from the tooth dies and secure the brackets to the patient's teeth. In such a procedure, it is very difficult to reposition the brackets precisely on the patient's teeth as they were positioned on the study model. Consequently, the archwire that was formed on the study model frequently needs to be modified when it is placed in the moutn. Additionally, a desired force asserted on the teeth as planned from the study model may not necessarily reflect the forces applied to the teeth when the archwire is affixed to the brackets in the patient's mouth.

It is very difficult to accurately position the brackets within the patient's moutn in an exact predetermined location. The orthodontist must, for the comfort of the patient, apply the brackets to the teeth in a rather expeditious manner while contending with the patient's tongue and saliva. Frequently, it is difficult for the patient to keep his mouth open for such an extended period of time.

It may therefore be understood that it is very difficult to utilize a study model with any precision because of the inability to accurately position the archwire brackets in the same position on the patient's teeth as the brackets had on the study model. Consequently, the indirect method has not enjoyed the success that was first proclaimed.

One of the principal objects of this invention is to provide a method for forming and constructing orthodontic archwires that is considerably more accurate and will enable orthodontists to more accurately construct archwires in accordance with their intended treatment procedure.

An additional object of this invention is to provide a method and apparatus that allows for external construction of the archwire without the attendant undesirable features of prior "indirect" methods.

A further object of this invention is to provide an orthodontic method and apparatus that greatly reduces the time for constructing the archwires and for progressive treatment after the original diagnostic work has been completed.

An additional object of this invention is to provide an orthodontic method in which more adequate application of the archwire forces may be utilized to accomplish the desired treatment procedure in a shorter period of time then heretobefore has been attainable.

A further object of this invention is to provide an orthodontic method in which a more accurate application of forces may be applied to the patient's teeth to accomplish desired correction of the malocclusion.

An additional object of this invention is to provide an orthodontic method and apparatus that enables the orthodontist to more easily obtain a progress status of the malocclusion corrections and to enable the progressive archwires to be constructed without forming the progressive archwires in the patient's mouth.

It is an additional object of this invention to provide orthodontic apparatus that is extremely simple to construct and easy to incorporate within present general procedures for improving the accuracy of orthodontic archwire fabrication.

These and other objects and advantages will become apparent upon reading the following detailed description, which taken with the accompanying drawings, disclose a preferred form of the invention.

A BRIEF DESCRIPTION OF THE DRAWINGS

A preferred form of the present invention is illustrated in the accompanying drawings, in which:

FIG. 1 is a fragmentary view illustrating the lower right quadrant of a patient's dentition with orthodontic bands and brackets attached to the teeth;

FIG. 2 is a pictorial view of a preferred embodiment of the apparatus of the present invention;

FIG. 3 is a pictorial view of an alternative apparatus of the present invention;

FIG. 4 is a cross-sectional view illustrating a portion of a tray and impression material held therein for forming a negative impression of the patient's teeth;

FIG. 8 is a similar view to FIG. 7 showing cuts made through the first pour of the die casting material to form individual tooth dies;

FIG. 9 is a pictorial view of the second pour of the die casting material as shown in FIGS. 7 and 8 with only the tooth dies removed;

FIG. 10 shows a cross-sectional view of a tooth die;

FIG. 11 is a pictorial view of a bite impression of the patient's teeth with three tooth dies supported therein; and FIG. 12 is a fragmentary view of a progressive working model.

DETAILED DESCRIPTION OF THE PREFERRED AND ALTERNATE EMBODIMENTS

Figure 5:
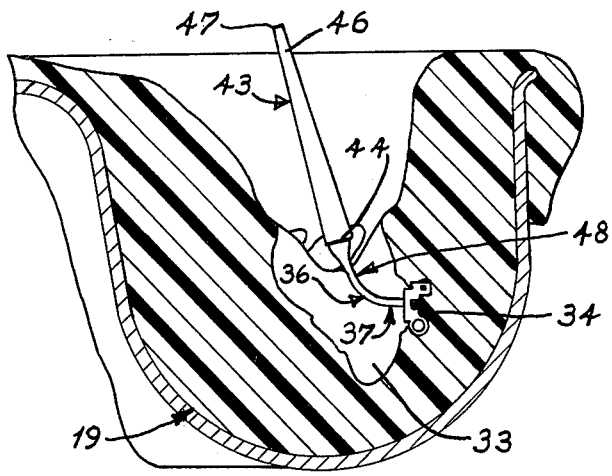
FIG. 5 is a sectional side view similar to FIG. 4 only showing the apparatus of the present invention in position therein.

Referring now in more detail to FIG. 1, the lower right quadrant 10 of a patient's jaw structure is illustrated exposing a number of teeth 11 that are supported by the patient's gum or gingiva 12. The crowns 13 of the teeth are exposed while the roots of the teeth are embedded in the gum. The crown includes a bite or occlusal surface 14.

The first step of this process includes securing a first set of orthodontic archwire brackets 15 to a selected number of the patient's teeth 11 as illustrated in FIG. 1. The brackets may be secured to the teeth by various techniques. One such technique is illustrated in FIG. 1. In this technique, the brackets are secured to bands 16, and the bands are mounted over the individual teeth. The bands are secured by adhesive to the teeth, locating the brackets in desired labial positions on the teeth. Generally the brackets are fixed to the bands 16 by soldering or by spotwelding Alternately, the brackets may be secured directly to the teeth by simply gluing or "luting" the brackets directly thereto. Such a technique would eliminate the use of bands. For the purposes of this invention, an important aspect is to secure the brackets to the teeth in a rather permanent manner so the brackets 15 are left on the teeth until the malocclusion is corrected or until the particular bracket is not needed for further orthodontic treatment.

It is desirable to mount the brackets to the teeth so that the brackets are substantially parallel with each other when in corrected position. However under this process, non-parallel positioning of the brackets can be more readily accommodated than with previous techniques.

The next step involves forming a negative impression 19 in resilient material of the patient's "malocclused teeth" and the first set of archwire brackets 15, creating tooth depressions 33 in the material that are complementary to the patient's teeth and bracket recesses 31 that are complementary to the brackets 15 secured to the patient's teeth. The material utilized for the negative impression is generally a suitable elastomeric impression material. Such commercially available elastomeric materials are commonly formed from silicone based rubber, mercaptan base material or hydrocolloid.

During the formation of the negative impression, the impression material is generally supported in a trough or tray 21 illustrated in FIG. 4. Each tooth depression 33 includes a labial or front surface 24 and a lingual or rear surface 25. Each of the surfaces 24 and 25 includes a crown section 26 and a "gingiva" or gun section 28. The numeral 29 indicates the intersection of crown section 26 and the gum section 28. It should be noted that the bracket recesses 31 are formed in the labial surfaces 24. After the negative impression materials is removed from the mouth, it is allowed to cure to form a mold. This mold is utilized for forming a positive replica of the teeth structure of which the negative impression was taken. Bracket recesses 31 have very intricate contours of brackets 15.

The next step involves the placing of a second set of brackets 34 substantially identical to the first set of brackets 15 in complementary bracket recesses 31. Although additional structure is illustrated in FIG. 5, the applicant's invention in the broadest aspect contemplates the mounting of the brackets 34 in the bracket recesses 31.

The next step involves the forming of a replica working model of the patient's teeth structure from the negative impression with the second set of archwire brackets 34 secured to the working model in corresponding locations as the first set of archwire brackets 15 are mounted on the patient's teeth. The working model is identified with the numeral 41 and may be referred to as the original working model illustrating the patient's malocclusion and teeth structure. The working model is formed utilizing a die material 40 which is fluid in nature and is poured into the negative impression and allowed to solidify. The die material may be selected from commercially available hard-setting plasters such as "Durox" die stone or the epoxy-based die resin or any other suitable materials. Depending upon the type of material, it may be necessary to utilize a means 36 for securing a second set of brackets to the die material. Such means include an adhesive coated on the back of the brackets or an anchor means 37 that is illustrated in the drawings. Additionally, bands similar to bands 16 may be utilized and positioned in the tooth depressions 33 with the brackets 34 affixed to the bands.

The anchor means 37 is attached to the back of the brackets and extends outwardly into the tooth depression with the die material surrounding the bracket and embedding the anchor means therein to secure the brackets 34 to the die material 40.

The working model 41 is formed with the second set of brackets 34 positioned on the positive replica in the same positions and orientations as the first set of brackets are positioned on the patient's teeth. From the orthodontists knowledge of tooth anatomy and from other information gained from diagnostic techniques such as X-ray, the orthodontist can determine the treatment sequence desirable to remove or correct the malocclusions. Frequently, the sequence involves first removing the rotation of the teeth by rotating the teeth about the root axis; secondly, aligning the teeth by moving the teeth either inwardly laterally or outward laterally to the root axis to align the teeth in a desired arch configuration; and thirdly, to raise or lower the teeth to position the bit surfaces 14 along a substantially flat occlusal plane. Sometimes, the malocclusion may be rather minor and the orthodontist may be able to construct the necessary archwire from the original working model 41.

The archwires are formed to fit the second set of archwire brackets 34 on the working model with the archwires exerting the desired corrective forces on the brackets 34. Once the archwires are formed, they may be removed from the working model and applied directly to the patient's mouth. One of the most favorable advantages of this invention is that the archwire, once constructed on the working model, may be positioned in the patient's mouth in a minimum amount of time and with minimum difficulty. Additionally, the accuracy in which the archwires can be constructed to apply the desired forces on the teeth is greatly increased.

Depending upon the degree of malocclusion, the orthodontist may desire to have progressive working models formulated upon which he may construct additional archwires for use in the progression of realigning the patient's teeth to a desired occlusion.

An additional advantage of this invention is its capability of being easily utilized in the formation of progressive working models. If progressive working models are desired, the orthodontist may proceed with additional process steps which comprise alternate embodiments of this invention. If progressive working models are desired, the orthodontist may perform the additional steps (prior to casting the working model 41) of positioning root stems 43 in the tooth depressions 33 in alignment along the tooth axes. The orthodontist can determine the angle of the root axis from known tooth anatomy and from other diagnostic techniques such as X-ray.

Root stems 43 have an enlarged end 44 and a reduced end 45 with tapered sides 46 extending from the enlarged end 44 to the reduced end 45. Reduced ends 45 have tips 47.

The root stems 43 are supported within the tooth depressions 23 at an angle corresponding to the root or tooth axis by means 48. Preferably the means 48 is secured to the second set of brackets 34 and supports the root stems 43 without the root stems engaging any of the surfaces of the negative impression.

Figure 6:
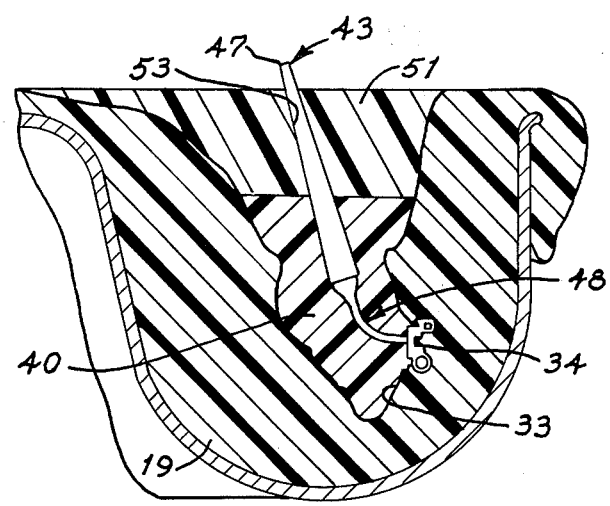
FIG. 6 is a similar view to FIG. 5 showing the impression filled with a first and second pour of die casting material to form a working model.
Figure 7:
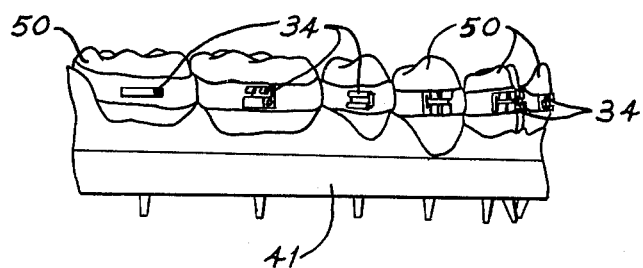
FIG. 7 is an elevational view of the lower right quadrant of the working model.

Alternatively, the working model 41 may be made in two sections; a first section composed of interconnected tooth dies 50 and a second section referred to as an index 51. The interconnected tooth dies are constructed by a first pour of die material that is poured into the negative impression to an elevation above the intersection 29 of the crown and gingiva. Preferably, the first pour is made to an elevation of approximately 4 mm above (into the gingiva) intersection 29. As illustrated in FIG. 6, the first pour covers approximately half the length of the root stems 43 so tips 47 extend upward above the first pour.

Once the die material of the first pour hardens, a separating medium is applied and a second pour of die material is made into the tooth depressions to form index 51. The second pour is made to an elevation wherein the material substantially covers root stems 43 except for the tips 47. The root stems 43 form stem sockets or holes 53 (FIG. 9) in the index with the sockets 53 aligned along simulated tooth axes.

The interconnected tooth dies 50 are then separated into a plurality of individual tooth dies 56. The separation may be accomplished by performing a series of vertical cutc 55 (FIG. 8) between adjacent teeth.

Next it is desirable to remove die material from the periphery of the simulated gum or gingiva. Preferably, sufficient amount of die material should be removed to form a simulated tooth root 58 (FIG. 10) which is substantially identical with the patient's tooth root except that the ends 45 of the root stems extend outwardly from the roots along the tooth axes.

The root stems have an irregular cross section so that tooth dies are prevented from being rotated while positioned in stem sockets 53. With such a procedure completed, it is rather simple to form progressive working models. Such a procedure may be accomplished by taking bite negative impressions of the crown surfaces of the teeth, including a portion of the first set of brackets 15. It is an advantage to be able to make progressive working models from bite impressions as opposed to the original negative impressions 19. Negative impressions frequently take considerably longer to form than bite impressions. Frequently, the rubber-based impression takes approximately 12 minutes to construct whereas the bite impression may take only 2 minutes. This is particularly significant considering that the patient must keep his mouth open during the time that the impression is being taken.

A bite impression 60 is illustrated in FIG. 11 in which the patient's teeth have formed crown tooth depressions 61. Depressions 61 include partial or total bracket recesses 63. To form a progressive working model, the desired tooth dies 56 are positioned in the corresponding crown tooth depressions 61 with the brackets 34 fitting in the bracket recesses 63 so the root stems 45 extend along root axes identical to those of the patient's teeth during a progressive stage at the time the bite impression was taken.

The tooth dies 56 are mounted in the bite impression and a progressive index 66 may be formed as illustrated in FIG. 12 in which the tooth dies 56 represent the exact positions of the patient's teeth during the progressive stage. Stem sockets 67 are formed in the progressive index in which the axes of the stem sockets correspond to the axes of the patient's teeth in the progressive stage. The new progressive working model 69, illustrated in FIG. 12, may be utilized in the construction of additional archwire that may be applied to the tooth for further correction of malocclusion.

This process may be repeated periodically as desired by the orthodontist in the construction of the various archwires that are needed to progressively realign the teeth to desired occlusion.

APPARATUS

This invention includes orthodontic apparatus 70 that is shown in perspective in FIG. 2. The orthodontic apparatus 70 includes a root stem 43. It has been previously described having enlarged end 44 and the reduced end 45 with tapered sides 46. The end 45 terminates at a tip 47. The root stem has a non-circular cross section so that it will not rotate within the index sockets. The orthodontic apparatus 70 includes an adjustable interconnecting member 71 having one end 72 affixed to the root stem 43 and an opposite end 73 attachable or securable to a back surface of a bracket 34. The adjustable interconnecting member is an elongated member preferably made from a bendable wire material which may be adjusted to enable the root stems to be positioned within the tooth depressions 33 at desired angles related to the axes of the patient's corresponding teeth. The bendable wire must be of sufficient strength to support the root stem 43 and of sufficient strength to hold the bracket 34 securely to the working model. Means 75 is provided on the end 73 for securing the member 71 to bracket 34. Preferably means 75 is comprised of a fixture or plate 76 formed integrally on the end 73 that may be soldered or welded to the back of the bracket 34.

An alternate embodiment 78 is illustrated in FIG. 3 in which the bracket 34 is formed integrally on the end 73 so that the bracket 34, root stem 43, and the interconnecting member 71 are integral components with the interconnecting member 71 being integrally interconnected to a back surface of the bracket 34. Such a configuration may be more desirable for orthodontists who don't have a supply of separate brackets 34, whereas the configuration illustrated in FIG. 2 is for orthodontists who already have a supply of brackets on hand. It should be noted that the apparatus 70 functions as an anchor means 37 and as the means 48 for supporting the root stem.

It should be understood that the above-described embodiments are simply illustrative of the principles of this invention and numerous other embodiments may be readily devised by those skilled in the art without deviating therefrom.

Therefore only the following claims are intended to define this invention.

What is claimed is:

1. In an orthodontic method for correcting a malocclusion of a patient's teeth utilizing archwires;
    securing a first set of archwise brackets on the patient's malocclused teeth at desired locations and orientations;
    forming a negative impression in resilient material of the patient's malocclused teeth and the secured first set of archwire brackets to create (1) tooth depressions in the resilient material complementary to the patient's malocclused teeth and (2) bracket recesses communicating with the tooth depressions complementary to the first set of archwire brackets;
    placing a second set of archwire brackets in the bracket recesses which are complementary to the bracket recesses; and
    forming a replica working model of the patient's teeth from the negative impression with the second set of archwire brackets secured to the working model in corresponding locations and orientations as the first set of archwire brackets.

2. In the method defined in claim 1, further comprising the steps of:
    forming an archwire to fit the second set of archwire brackets on the working model with the archwire exerting desired correctional forces on the brackets;
    transferring the formed archwire to the first set of archwire brackets on the patient's teeth to apply the desired correctional forces to the patient's teeth to correct the malocclusion.

3. In the method defined in claim 1 wherein the working model is formed with hard-setting dental die material having the second set of brackets secured thereto.

4. In the method as defined in claim 3 wherein the second set of brackets have anchoring means thereon that project into the tooth depressions when the second set of brackets are placed in the bracket recesses and wherein the method further includes the steps of embedding the anchor means in the hard-setting dental die material as the working model is formed to secure the second set of brackets to the working model.

5. In the method as defined in claim 3 further comprising the steps of embedding elongated root stems in the hard-setting dental die material during the formation of the working model at orientations corresponding to the orientations of the patient's teeth.

6. In the method as defined in claim 5 wherein the root stems are embedded in the hard-setting dental die material by:
    supporting the root stems in the tooth depressions from the second set of brackets;
    orienting the root stems at orientations within the tooth depressions corresponding to the orientations of the patient's teeth;
    pouring the hard-setting dental die material into the tooth depressions about the oriented root stem;
    allowing the hard-setting dental die material to harden to embed the root stems in the die material.

7. In the orthodontic method as defined in claim 1 wherein the working model is formed by:
    mounting root stems in corresponding tooth depressions at orientations corresponding to orientations of the patient's malocclused teeth with ends of the root stems extending from the tooth depressions;
    filling the negative impression with a hard-setting dental die material to a level above the tooth depressions and below the ends of the root stems to form a working model having a row of interconnected tooth dies in which each die is comprised of a crown portion and a gingiva portion and having a root stem embedded therein with an end extending from the gingiva portion at an orientation corresponding to the orientation of the corresponding patient's tooth and having a bracket of the second set secured thereto on the crown portion at a location and orientation corresponding to the location and orientation of the corresponding bracket on the patient's teeth; and forming a working model index for supporting the teeth dies in which the index has sockets formed therein for receiving the ends of the root stems in which the sockets have orientations corresponding to the orientations of the patient's teeth.

8. In the orthodontic method as defined in claim 7 further comprising the steps of:
separating the row of interconnected teeth dies into a plurality of individual tooth dies;
removing die material from the gingiva portion of each die to reduce the circumference of the gingiva portion to enable the dies to be readily removed and reinserted into the working model index.

9. In the orthodontic method as defined in claim 8 wherein sufficient die material is removed from the gingiva portion of each die to simulate the tooth root with the root stem extending along the root axis.

10. In the orthodontic method as defined in claim 8 further comprising the steps of:
forming an archwire to fit the second set of archwire brackets on the teeth dies when the dies are mounted in the index with the stem ends projecting into the corresponding index sockets wherein the archwire exerts desired correctional frces on the second set of brackets; and
transferring the formed archwire to the first set of archwire brackets on the patient's teeth to apply the desired forces to the teeth for correcting the malocclusion.

11. In the orthodontic method as defined in claim 10 further comprising the step of forming a progressive working model of the patient's teeth in an advanced stage of malocclusion correction by:
sequentially forming a progress bite impression of the crown of the patient's teeth to form corresponding crown depressions of the teeth;
mounting the tooth dies within the corresponding crown depressions with the root stems extending at orientations corresponding to the orientations of the teeth in the advanced stage of malocclusion corrections;
forming a progressive index for supporting the tooth dies in which the progressive index has root stem sockets for receiving the root stems, the sockets being oriented in correspondence to the orientation of the teeth in the advanced stage of malocclusion correction.

12. In the orthodontic method as defined in claim 11 further comprising the steps of:
forming a second archwire to fit the second set of archwire brackets on the tooth dies when the dies are mounted in the progressive index with the root stem ends projecting into the root stem sockets with the archwire exertng desired correctional forces on the second set of brackets; and
transferring the formed second archwire to the first set of brackets on the patient's teeth to apply the desired correctional forces to the teeth to further correct the malocclusion.

13. An orthodontic apparatus for connecting with an orthodontic bracket for use in the formation of orthodontic archwires, comprising:
a root stem; and
a bendable interconnecting member affixed to one end of the root stem and extending outward therefrom terminating in a remote end for operatively interconnecting an orthodontic bracket to the root stem to enable the root stem to be angularly positional with respect to the orthodontic bracket to position the root stem along the axis of a tooth in the preparation of a working model; and said interconnecting member having an enlarged attachment fixture at the remote end for facilitating attachmet of the interconnecting member to the orthodontic bracket.

14. The apparatus as defined in claim 13 wherein the bendable interconnecting member has a mounting fixture affixed to one end thereof for facilitating attachment of the orthodontic bracket to the interconnecting member.

15. The apparatus as defined in claim 13 wherein the bendable interconnecting member is a bendable wire.

16. An orthodontic apparatus for use in forming and fitting orthodontic archwires, comprising:
an elongated root stem;
an orthodontic bracket having a back surface; and
a bendable interconnecting member interconnecting the root stem and the back surface of the orthodontic bracket enabling the root stem to be adjustable angularly positioned in relation to the orthodontic bracket to position the root stem along the axis of a tooth in the preparation of a working model.

* * * * *